(12) United States Patent
Huang et al.

(10) Patent No.: US 8,053,397 B2
(45) Date of Patent: Nov. 8, 2011

(54) USING NANOPARTICLES FOR WATER FLOW CONTROL IN SUBTERRANEAN FORMATIONS

(75) Inventors: Tianping Huang, Spring, TX (US); James B. Crews, Willis, TX (US); Michael H. Johnson, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 414 days.

(21) Appl. No.: 12/122,847

(22) Filed: May 19, 2008

(65) Prior Publication Data

US 2009/0286702 A1 Nov. 19, 2009

(51) Int. Cl.
*C09K 8/74* (2006.01)
(52) U.S. Cl. .......................... 507/269; 166/279; 166/285
(58) Field of Classification Search .................. 507/269; 166/279, 285
See application file for complete search history.

(56) References Cited

U.S. PATENT DOCUMENTS

| | | | |
|---|---|---|---|
| 4,004,639 A | | 1/1977 | Sandiford |
| 4,085,799 A | * | 4/1978 | Bousaid et al. ............ 166/272.4 |
| 4,570,715 A | * | 2/1986 | Van Meurs et al. ........... 166/302 |
| 5,238,064 A | * | 8/1993 | Dahl et al. .................... 166/293 |
| 5,735,349 A | | 4/1998 | Dawson et al. |
| 5,964,295 A | | 10/1999 | Brown et al. |
| 6,145,591 A | * | 11/2000 | Boncan et al. ................ 166/291 |
| 6,433,075 B1 | | 8/2002 | Davies et al. |
| 7,008,908 B2 | | 3/2006 | Chan et al. |
| 7,081,439 B2 | | 7/2006 | Sullivan et al. |
| 7,223,827 B1 | | 5/2007 | Miller |
| 2004/0031611 A1 | | 2/2004 | Huang et al. |
| 2005/0252658 A1 | | 11/2005 | Willingham et al. |
| 2006/0102345 A1 | * | 5/2006 | McCarthy et al. .......... 166/250.1 |
| 2007/0056732 A1 | * | 3/2007 | Roddy et al. .................. 166/292 |
| 2008/0000640 A1 | | 1/2008 | Santra et al. |
| 2008/0023201 A1 | | 1/2008 | Huang et al. |
| 2008/0105428 A1 | * | 5/2008 | Santra et al. .................. 166/293 |
| 2009/0111718 A1 | | 4/2009 | Gadiyar et al. |

OTHER PUBLICATIONS

R. Bandyopadhyay, et al., "Effect of Silica Colloids on the Rheology of Viscoelastic Gels Formed by the Surfactant Cetyl Trimethylammonium Tosylate," Journal of Colloid and Interface Science, 2005, pp. 585-591, vol. 283.

B. A. Hardage, et al., "Gas Hydrate—A Source of Shallow Water Flow?" The Leading Edge, May 2006, pp. 634-635.

E. Ali, et al., "Effective Gas Shutoff Treatments in a Fractured Carbonate Field in Oman," SPE Annual Technical Conference, Sep. 24-27, 2006, pp. 1-12, SPE 102244, San Antonio, Texas.

* cited by examiner

*Primary Examiner* — Alicia Toscano
(74) *Attorney, Agent, or Firm* — Mossman Kumar & Tyler PC

(57) ABSTRACT

Non-aqueous carrier fluids containing nano-sized particles in high concentration are effective for zone isolation and flow control in water shutoff applications for subterranean formations. The nanoparticles interact with water and solidify it to inhibit its flow, but do not have the same effect on hydrocarbons and thus selectively assist the production of hydrocarbons while suppressing water. Suitable nanoparticles include alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and/or pyroelectric crystals.

19 Claims, 1 Drawing Sheet

USING NANOPARTICLES FOR WATER FLOW CONTROL IN SUBTERRANEAN FORMATIONS

TECHNICAL FIELD

The present invention relates to methods and compositions to inhibit or shut-off the flow of water in subterranean formations, and more particularly relates, in one embodiment, to methods of using non-aqueous fluids containing certain nanoparticles to selectively inhibit or shut-off the flow of water in subterranean formations but not inhibit the flow of hydrocarbons during hydrocarbon recovery operations.

TECHNICAL BACKGROUND

Certain subterranean oil producing wells are formed or completed in formations which contain both oil-producing zones and water-producing zones. Unwanted water production is a major problem in maximizing the hydrocarbon production potential of these wells. Tremendous costs may be incurred from separating and disposing of large amounts of produced water, inhibiting the corrosion of tubulars, replacing tubular equipment downhole, and surface equipment maintenance. Shutting off unwanted water production is a necessary condition to maintaining a productive field. While there is a wide array of treatments available to solve these problems, they all suffer from a number of difficulties, including, but not necessarily limited to, surface mixing and handling problems, etc.

For instance, traditional water shut-off technology with chemicals uses sodium silicate solutions and crosslinked polymers. The silicate solution is typically not compatible with formation waters, since sodium silicate reacts with calcium chloride instantly to generate gel. In this approach, the two solutions may be injected in any order and must be separated by a slug of an inert aqueous spacer liquid. U.S. Pat. No. 4,004,639 provides chemicals to achieve water shut-off in producing wells. It uses base fluid sodium silicate solution and gelling agent ammonium sulfate. Those two solutions are injected and separated by a slug of an inert aqueous spacer liquid. However, these technologies cannot generate uniform gels to plug the porous medium and cannot place the gel deep into the formation. Several staged treatments are also required in pumping the fluids using these techniques.

Crosslinked polymers have also been used to shut off or inhibit water flow. However, crosslinked polymer technology may need separate crosslinkers from the linear polymer fluid separated by a slug of an inert spacer in a form of multi-stage pumping. Crosslinked polymer technology may also use a delayed crosslinking method which may depend on the formation temperature and fluid traveling time in the formation as factors to delay the crosslinking.

Shallow water flow is a serious drilling hazard encountered in several deep water drilling situations including those in the Gulf of Mexico. A number of incidents have occurred in which strong shallow water flows have disrupted drilling operations and added millions of dollars to the cost of a well, or caused a well to be abandoned. It would be desirable if a method and/or composition could be employed to inhibit or prevent shallow water flow in these situations.

Further, improvements are always needed in controlling injection profiles for steam and thermal recovery operations, and to control water injection to improve sweep efficiency during secondary and tertiary recovery of hydrocarbons.

There remains a need to find a chemical system that will simplify the pumping schedule and permit deep penetration into the formation to shut off the water channels in an effective manner and keep oil flow channels open.

SUMMARY

There is provided, in one form, a method for inhibiting or preventing the flow of water in a subterranean formation that involves injecting a treating slurry into the subterranean formation where water is present. The treating slurry includes a non-aqueous carrier fluid that may be an oil and/or a glycol. The treating slurry also contains an amount of nanoparticles effective to inhibit the flow of water when the treating slurry contacts water. The nanoparticles have a mean particle size between about 4 to about 2000 nanometers (nm). Suitable nanoparticles include, but are not necessarily limited to, alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and/or pyroelectric crystals. The method further involves contacting the water with the treating slurry to solidify the nanoparticles within the subterranean formation. The solidified nanoparticles selectively inhibit or prevent the flow of water in the formation, but permit the flow of hydrocarbons.

DETAILED DESCRIPTION

Figure 1:
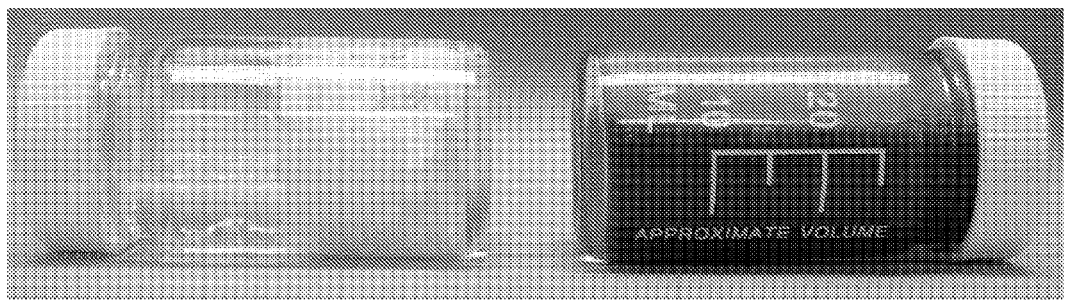
FIG. 1 is a photograph of two bottles containing a treatment fluid of nanoparticles dispersed in mineral oil, where in the bottle on the left the treatment fluid had contacted simulated formation water showing solidification at the contact surface and where in the bottle on the right the treatment fluid had contacted a crude oil sample showing the nanoparticles slurry dispersed in the crude with no solidification.

It has been surprisingly discovered that a slurry of a high concentration of tiny particles mixed with a non-aqueous carrier fluid can selectively reduce or prevent water production and flow from subterranean formations, but permits the flow of hydrocarbons. The water in the subterranean formation may be brine. The treating slurry is pumped into the formation and contacts the formation water in water flowing channels, the small particles are solidified at those water flowing channels and will thus plug them preventing or greatly inhibiting water flow. However, when the treating slurry contacts hydrocarbons, for instance crude oil or natural gas, no solidification occurs and the oil and/or gas flow channels are kept open to flow. The slurry does not substantially inhibit the flow of hydrocarbons it encounters, where "substantially inhibit" means that at least 95% of the flow of hydrocarbons occurs that would normally occur if the flow of hydrocarbons had not encountered the slurry.

The treatment slurries herein may thus find particular application to helping prevent or inhibit the production of water from water zones of subterranean formations and selectively permit the improved production of hydrocarbons from the hydrocarbon bearing zones of the same formation. This prevention or inhibition of water flow is often referred to as water control and/or water shut-off. The methods and compositions herein may also be used to seal casing leaks and inhibit or prevent cement leaking, and also to control loss circulation of drilling fluid through water zones.

The methods and compositions described herein may also be used to stop or inhibit shallow water flows (SWF) in deepwater drilling. Deepwater drilling is defined herein as drilling in water at least 500 meters deep. The "shallow" in SWF generally refers to the depth at which the water flows below the seafloor, not the depth of water at the drill site. "Shallow" is defined herein to be 1000 meters or less below the seafloor. SWF may be defined as water flowing on the outside of the structural casing up to the ocean floor. It will be appreciated that this causes seafloor erosion which may cause major damage to an undersea drilling template and its wells.

It is also known in the art to inject water into a subsurface formation to displace hydrocarbons (oil and gas) from one part of the formation to another as a step in a process of enhancing the recovery of the desirable fluid from the formation (enhanced oil recover or EOR). During water injection, the injected water can at times more readily flow into and through one part of the formation as compared to another part of the formation. The formation, or part thereof, into which the water more readily flows is sometimes referred to as channeling or a thief zone. The flow, thus, is not uniform with the result that desired displacement of oil and gas is not achieved. It is believed that variations in the physical properties of the formation, for example, formation permeability and porosity, may cause this non-uniform flow. Efforts to render the physical properties of a formation more uniform so as to cause injected water to uniformly flow into and through the entire formation have been referred to in the art as profile modification and/or as conformance control. The treating slurries herein may be advantageously used to shut off or prevent the injected water from wastefully flowing into these thief zones. Thus, the methods and compositions herein may be used to improve water injection control to increase sweep efficiency during secondary and tertiary hydrocarbon recovery. In one non-limiting example the nanoparticle treating slurries can be staged rather than one continuous injection of the nanoparticle treating slurry to improve treating fluid placement and/or distribution within the treated zone.

In secondary and tertiary recovery, many times an aqueous solution is injected into a reservoir to push oil from an injection well to a production well. The injected water eventually "breaks through" at the producer creating a channel of mostly water from the injection well to the producer. When this happens, the water cut increases drastically and the oil volume drops. However, there can be significant amounts of oil left behind that was not swept by the water injection. A typical pattern for this type of recovery is called a 5 spot pattern; a single injector in the middle of 4 producers—much like the five spots on a single die. As can be seen from the pattern, water may stream from the injector to the producers leaving a significant volume of un-swept reservoir. This problem is even more prevalent when vertical heterogeneities are present in the reservoir. This would lead to poor recovery from an un-swept areas reservoir in horizontal and vertical sections of the reservoir. On way to improve reservoir sweep is to inject a conformance treatment, such as the nanoparticles, into the reservoir to block the water channels between the injector and producers. Thus providing greater reservoir sweep and more oil recovery.

Thermal recovery is any injection process that introduces heat into a reservoir. Thermal recovery may be used to produce viscous, thick oils with API gravities less than about 20. These oils cannot flow unless they are heated and their viscosity is reduced enough to allow flow toward producing wells. Steam is often used to transfer the heat downhole to the viscous oil. A two-phase mixture of liquid water and steam may be produced from a generator. The latent heat of vaporization is very high, and when the steam condenses within the reservoir, a significant amount of the heat is transferred to the fluids and the formation rock. Since steam is lighter and more mobile than oil, the gravity differences and channeling of the steam through the most permeable parts of the subterranean reservoir may create sweep-efficiency problems during the steam-injection process. The use of the nanoparticles treating slurries herein can help block off areas with solidified nanoparticles to improve injection profile control for these steam and thermal recovery operations. In one non-limiting example, the nanoparticles treating slurries can be injected in stages, alternating with the steam-injections, to optimize sweep-efficiency in the treated zone.

The size of the nanoparticles used in the treating slurries may range from about 4 nanometers to about 2000 nm; in one non-limiting embodiment from about 4 nm independently up to about 1000 nm. In another non-limiting embodiment, the particle size ranges between about 4 nanometers independently up to about 500 nanometers. In another non-restrictive version, the particles may have a mean particle size of about 250 nm or less, alternatively about 100 nm or less, and in another possible version about 50 nm or less, alternatively 40 nm or less.

Nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for solidifying at high concentrations into plugs, obstructions, and other barriers upon contact with water and thus serve to prevent, inhibit, eliminate, abate, retard, suppress, impede, and otherwise control water flow.

In particular, magnesium oxide nanoparticles and powders have been suitably used to solidify and form barriers herein. However, it will be appreciated that although MgO particles are noted throughout the description herein as one representative or suitable type of nanoparticles, that other alkaline earth metal oxides and/or alkaline earth metal hydroxides, alkali metal oxides and/or alkali metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, any of the nanoparticle types may be used alone or in combination with any of the other nanoparticle types in mixtures thereof. In one non-limiting embodiment, the alkaline earth metal in these nanoparticles may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Na, K, Mg, Ca, Ti, Zn and/or Al. In one non-limiting embodiment, there is an absence of alumina (aluminum oxide) and/or aluminum hydroxide from the suitable nanoparticles, but in other embodiments, aluminum oxide and aluminum hydroxide are expected to function in these methods and compositions.

The nano-sized particulate additives herein may also be piezoelectric crystal particles (which include pyroelectric crystal particles). Pyroelectric crystals generate electrical charges when heated and piezoelectric crystals generate electrical charges when squeezed, compressed or pressed.

Generally, pyroelectric crystals are also piezoelectric. Pyroelectric crystals generate electrical charges when heated and piezoelectric crystals generate electrical charges when squeezed, compressed or pressed. In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is −9.4 $C/m^2K$. ZnO and these other crystals are generally not water soluble.

The nano-sized particles herein may be added to a glycol, polyol, olefin, vegetable oil, or mineral oil, or mixtures of these, as a non-aqueous carrier fluid. Suitable carrier fluids include, but are not necessarily limited to, glycols, glycol ethers, polyols, propylene carbonate, carboxylate esters, terpene, vegetable oils, mineral oils, mineral spirits, diesel, biodiesel, condensate, aromatic hydrocarbons, and combinations thereof. Condensate is defined herein as a low-density mixture of hydrocarbon liquids that are present as gaseous components in the raw natural gas produced from many natural gas fields. It condenses out of the raw gas if the temperature is reduced to below the hydrocarbon dew point temperature of the raw gas. One particularly suitable carrier fluid may be monopropylene glycol, but ethylene glycol, glycerol and mixtures thereof may be suitable. Alternatively, suitable carrier fluids include, but are not necessarily limited to, mineral oil or other hydrocarbon that accomplishes the purposes of the methods and compositions described herein. Specific, non-limiting examples of suitable mineral oils include ConocoPhillips PURE PERFORMANCE® Base Oils II or III, such as 225N, 600N, ULTRA-S™ 3 and ULTRA-S™ 8 oils; Penreco DRAKEOL® oils, such as DRAKEOL® 21, DRAKEOL® 35 and DRAKEOL® 600; and ExxonMobil Chemical mineral oils, such as EXXSOL® D80 and ISO-PAR® M oils. It is expected that a suitable treating slurry will include nanoparticles in the carrier fluid oil, for instance about 15 wt % nano-sized MgO particles in the DRAKEOL® 600 mineral oil. Specific non-limiting examples of suitable aromatic hydrocarbons are xylene and toluene. Specific non-limiting examples of suitable carboxylate esters are ethyl acetate and methyl benzoate. Specific non-limiting examples of suitable vegetable oils are corn oil and soybean oil. In a non-limiting example, the carrier fluid may additionally have a surfactant present, such as an oil-wetting surfactant like sorbitan monooleate (i.e. SPAN 80 from Uniqema), to increase particles' loading in the oil based carrier fluid. Other agents besides SPAN 80 may be employed including, but not necessarily limited to, sorbitan esters, ethoxylated sorbitan esters, ethoxylated alcohols, ethoxylated alkyl-phenols, alkyl-dicarboxylics, sulfosuccinates, phospholipids, alkyl-amines, quaternary amines, alkyl-siloxanes, and the like.

The nanoparticles are present in the carrier fluid in a relatively high concentration. In one non-limiting embodiment the amount of nanoparticles in the treating slurry ranges from about 2 to about 50 weight percent based on the total treating slurry. Alternatively, the amount of nanoparticles in the treating slurry ranges from about 10 independently up to about 40 weight percent based on the total treating slurry.

The solidified nanoparticles barrier may be removed by a number of techniques. For instance, an acid may be subsequently injected into the subterranean formation to dissolve at least a portion of the nanoparticles and substantially restore water flow. By "substantially restore water flow" is meant that at least 50 volume % of the water flow is restored as compared with the water flow absent any solidified nanoparticles in the first place. Suitable acids for this purpose include, but are not necessarily limited to, mineral acids such as hydrochloric acid and sulfuric acid, and organic acids, such as carboxylic acids including formic acid, acetic acid, and the like, dicarboxylic acids including adipic acid, succinic acid, glutaric acid, maleic acid, tartaric acid and the like, citric acid and the mixture of those acids. In one non-limiting example the suitable acid fluid can be pumped in alternating stages with stages of low molecular weight polymer viscosified aqueous fluid to improve acid placement in the treated zone for solidified nanoparticles removal. In another non-limiting example, a portion of the acid fluid to be injected can be viscosified with a polymer and pumped in stages with the treating acid fluid to optimize placement for solidified nanoparticles removal.

The inventive treatment slurry system may be pumped into the target zone at a pressure less than formation fracture pressure, and after pumping is stopped, the treating slurry upon contact with water will solidify the nanoparticles and block water movement and transport in the porous media of underground formation. Since the nanoparticles solidification occurs in situ, better control on the placement of the barrier, blockage or plug is achieved and deeper penetration of the shut-off fluid is accomplished with all of the effective permeability of the target zone receiving an effective flow control or plugging slurry. The solidified nanoparticles will stop, prevent, retard or inhibit unwanted or undesirable water production. For high permeability or naturally fractured active zones, the treating slurry herein will selectively plug unwanted water flow channels, and will let oil flow channels form and let the oil be produced, since oil contacting the treating slurry will break or reduce the viscosity thereof. For regular and low permeability zones, it takes longer time to form oil flow channels because the contact area between oil and treating slurry in the porous media is smaller than in high permeability zones.

It will be appreciated that although the methods and compositions herein have been spoken of as being able to completely shut off water flow in subterranean formations, that the methods and compositions described herein are considered successful even if less than complete shut-off is accomplished. Inhibition, reduction, diminishing, decreasing, and lessening of the water flow through the use of the solidified nanoparticles herein are all considered successful, as are the complete shut-off, prevention, cessation, stoppage, end and termination of water flow, that is, complete control of the water flow.

The nano-sized particles are suspected of having chemistry useful for solidification in the presence of water. Without being limited to any one particular theory, it is suspected that some nano-sized MgO particles have unique particle surface charges that use charge attraction, surface adsorption and/or other chemistries to associate, relate or join together in the presence of water, but not in the presence of hydrocarbons. It is expected that the use of pyroelectric crystal and/or piezoelectric crystal particles in contact with an aqueous fluid demonstrate solidification of the nanoparticles together, at least partly as a result of their pyroelectric and/or piezoelectric properties. In one non-limiting explanation or theory, high temperatures and/or pressures heat and/or squeeze or press the crystal nanoparticles thereby causing more electrical charges on their surfaces. The particles with surface charges thereby associate, connect or link together. The discovery of the benefit of piezoelectric and/or pyroelectric crystals allows the treating slurry to inhibit, prevent or shut off the flow of water when the slurry is used to solidify the nanoparticles as a plug or block or inhibitor to flow.

The nanoparticles herein are believed to be particularly useful in treating slurries used for well completion or stimulation and other uses and applications where the blocking or inhibiting the flow of aqueous fluids may be desired, such as the water shut off methods herein.

The treatment slurries may be prepared by blending or mixing the nanoparticles into a non-aqueous carrier fluid using conventional mixing equipment, methods and techniques.

The proportion of treating slurry added or injected into any subterranean formation may vary widely depending upon a number of factors including, but not necessarily limited to, the nature of the formation, the formation conditions (e.g. temperature, pressure, permeability, etc.), the particular composition components, the injection method, the interaction of these various factors, and the like. Thus, the proportions of the treating fluid to be injected into a subterranean formation cannot, in general, be specified in advance without taking these interrelated factors into account.

In one non-restrictive embodiment herein, the treatment slurry may contain other viscosifying agents, other different surfactants, clay stabilization additives, scale dissolvers, biopolymer degradation additives, and other common and/or optional components.

The invention will be further illustrated with respect to certain experiments, but these examples are not intended to limit the invention, but only to further describe it in certain specific, non-limiting embodiments.

EXAMPLES

A slurry of mineral oil or glycol mixed with a high concentration (from about 2 to about 50% by weight (bw)) of small particles, such as 35 nm magnesium oxide (the size can be less than 2 microns), may be used for selective formation water shutoff. When the slurry contacts the formation water, the small particles of magnesium oxide will be solidified at water flowing channels and plug them. When the slurry contacts hydrocarbons (e.g. crude oil or gas), no solidification occurs and keep oil flow channels open to flow.

Test A

Test A (mineral oil based nanoparticles): 10 mls of 1.5 ppg (15% bw) FLC-41 particles (FLC-41 is a 35 nm mean particle size MgO, product #12N-0801 available from Inframat Advanced Materials) in 225N mineral oil (225N Base Oil from ConocoPhillips) was contacted with 10 mls of simulated formation water having 1% bw $CaCl_2$. The contact surface was solidified in 40 minutes (the bottle on the left side of FIG. 1). This indicates that the nanoparticles can shut off water flow. Next, 10 mls of 1.5 ppg FLC-41 particles in 225N mineral oil was contacted with 10 mls API 29 crude oil (sample from Gulf of Mexico). The nanoparticle slurry dispersed in the crude (the bottle on the right side of FIG. 1) and did not solidify, thus indicating that nanoparticles in the treating slurry permit the flow of hydrocarbons.

Test B

Figure 2:
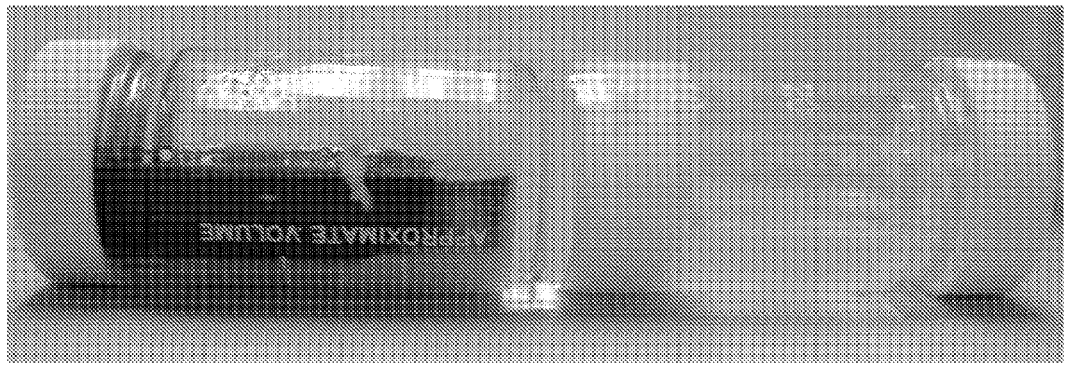
FIG. 2 is a photograph of two bottles containing a treatment fluid of nanoparticles dispersed in monopropylene glycol, where in the bottle on the right the treatment fluid had contacted formation water showing solidification at the contact surface and where in the bottle on the left the treatment fluid had contacted a crude oil sample showing no solidification.

Test B (glycol based nanoparticles): 10 mls of 2.0 ppg (19% bw) FLC-41 particles in 99.8% monopropylene glycol was contacted with 10 mls of formation water having 1% bw $CaCl_2$. The contact surface was solidified in 25 minutes (the bottle on the right side of the photograph in FIG. 2). In contrast, 10 mls of 1.5 ppg FLC-41 (19% bw) particles in 99.8% monopropylene glycol was contacted with 10 mls API 29 crude oil (a sample from the Gulf of Mexico). The nanoparticle slurry did not solidify (the left bottle in FIG. 2).

Chemical compositions and methods are thus provided for inhibiting or shutting off the flow and/or production of water in and from a subterranean formation. Further, chemical compositions and methods are provided for use in inhibiting or shutting off the flow and/or production of water in and from a subterranean formation that may be injected at once and that which forms a uniform solidified mass of nanoparticles.

In the foregoing specification, the invention has been described with reference to specific embodiments thereof, and has been demonstrated as effective in providing a method of inhibiting and/or shutting off water flow in subterranean formations. However, it will be evident that various modifications and changes can be made to the inventive compositions and methods without departing from the broader spirit or scope of the invention as set forth in the appended claims. Accordingly, the specification is to be regarded in an illustrative rather than a restrictive sense. For example, specific combinations of nanoparticles types and sizes, carrier fluids, and other components falling within the claimed parameters, but not specifically identified or tried in a particular composition or under specific conditions, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method for inhibiting or preventing a flow of water in a subterranean formation comprising:
    injecting into the subterranean formation where water is present, a treating slurry comprising:
        a non-aqueous carrier fluid and particles,
            where the non-aqueous fluid is selected from the group consisting of oils, glycols and mixtures thereof, and
            where the particles are added in an amount effective to inhibit the flow of water when the treating slurry contacts water and consist of nanoparticles having a mean particle size between about 4 to 500 nm and are selected from the group consisting of piezoelectric crystals and pyroelectric crystals in turn selected from the group consisting of berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof; and
    contacting the water with the treating slurry to solidify the nanoparticles within the subterranean formation where the solidified nanoparticles inhibit or prevent the flow of water in the formation.

2. The method of claim 1 where the non-aqueous carrier fluid is selected from the group consisting of glycol ethers, polyols, propylene carbonate, carboxylate esters, terpene, vegetable oils, mineral oils, mineral spirits, diesel, biodiesel, condensate, aromatic hydrocarbons, ethylene glycol, propylene glycol, glycerol and mixtures thereof.

3. The method of claim 1 where the amount of nanoparticles in the treating slurry ranges from about 2 to about 50 weight percent based on the total treating slurry.

4. The method of claim 1 where the non-aqueous carrier fluid does not inhibit a flow of hydrocarbons it encounters.

5. The method of claim 1 further comprising subsequently injecting an acid into the subterranean formation to dissolve at least a portion of the nanoparticles and substantially restore water flow.

6. The method of claim 1 where the subterranean formation is beneath a seabed that is at least 500 meters deep and the water present in the subterranean formation is a shallow water flow.

7. The method of claim 1 further comprising subsequently injecting heat into the subterranean formation, where the solidified nanoparticles at least partially control where the heat is injected.

8. The method of claim 1 further comprising inhibiting water flow to improve sweep efficiency during secondary and/or tertiary recovery of hydrocarbons from the subterranean formation, where the injecting is performed in an injection well to inhibit or prevent a water flow from the injection well to at least one production well.

9. A method for inhibiting or preventing a flow of water in a subterranean formation comprising:
  injecting into the subterranean formation where water is present, a treating slurry comprising:
    a non-aqueous carrier fluid and particles,
      where the non-aqueous fluid is selected from the group consisting of oils, glycols and mixtures thereof, and
      where the particles are added in an amount of about 2 to about 50 weight percent based on the total treating slurry and consist of nanoparticles having a mean particle size between about 4 to 500 nm and are selected from the group consisting of piezoelectric crystals and pyroelectric crystals in turn selected from the group consisting of berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof; and
  contacting the water with the treating slurry to solidify the nanoparticles within the subterranean formation where the solidified nanoparticles inhibit or prevent the flow of water in the formation and where the nanoparticles in the non-aqueous carrier fluid do not inhibit the flow of hydrocarbons they encounter.

10. The method of claim 9 where the non-aqueous carrier fluid is selected from the group consisting of glycol ethers, polyols, propylene carbonate, carboxylate esters, terpene, vegetable oils, mineral oils, mineral spirits, diesel, biodiesel, condensate, aromatic hydrocarbons, ethylene glycol, propylene glycol, glycerol and mixtures thereof.

11. The method of claim 9 further comprising subsequently injecting an acid into the subterranean formation to dissolve at least a portion of the nanoparticles and substantially restore water flow.

12. The method of claim 9 where the subterranean formation is beneath a seabed that is at least 500 meters deep and the water present in the subterranean formation is a shallow water flow.

13. The method of claim 9 further comprising subsequently injecting heat into the subterranean formation, where the solidified nanoparticles at least partially control where the heat is injected.

14. The method of claim 9 further comprising inhibiting water flow to improve sweep efficiency during secondary and/or tertiary recovery of hydrocarbons from the subterranean formation, where the injecting is performed in an injection well to inhibit or prevent a water flow from the injection well to at least one production well.

15. A method for inhibiting or preventing a flow of water in a subterranean formation comprising:
  injecting into the subterranean formation where the water is present, a treating slurry comprising:
    a non-aqueous carrier fluid and particles,
      where the non-aqueous fluid is selected from the group consisting of glycol ethers, polyols, propylene carbonate, carboxylate esters, terpene, vegetable oils, mineral oils, mineral spirits, diesel, biodiesel, condensate, aromatic hydrocarbons, ethylene glycol, propylene glycol, glycerol and mixtures thereof and
      where the particles are added in an amount of about 10 to about 40 weight percent based on the total treating slurry and consist of nanoparticles having a mean particle size between about 4 to 500 nm and are selected from the group consisting of piezoelectric crystals and pyroelectric crystals in turn selected from the group consisting of berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof; and
  contacting the water with the treating slurry to solidify the nanoparticles within the subterranean formation where the solidified nanoparticles inhibit or prevent the flow of water in the formation and where the nanoparticles in the non-aqueous carrier fluid do not inhibit the flow of hydrocarbons they encounter.

16. The method of claim 15 further comprising subsequently injecting an acid into the subterranean formation to dissolve at least a portion of the nanoparticles and substantially restore the water flow.

17. The method of claim 15 where the subterranean formation is beneath a seabed that is at least 500 meters deep and the water present in the subterranean formation is a shallow water flow.

18. The method of claim 15 further comprising subsequently injecting heat into the subterranean formation, where the solidified nanoparticles at least partially control where the heat is injected.

19. The method of claim 15 further comprising inhibiting the water flow to improve sweep efficiency during secondary and/or tertiary recovery of hydrocarbons from the subterranean formation, where the injecting is performed in an injection well to inhibit or prevent a water flow from the injection well to at least one production well.

* * * * *